(12) United States Patent
Andrew et al.

(10) Patent No.: US 9,367,429 B2
(45) Date of Patent: Jun. 14, 2016

(54) DIAGNOSTICS OF DECLARATIVE SOURCE ELEMENTS

(71) Applicant: Microsoft Technology Licensing, LLC, Redmond, WA (US)

(72) Inventors: Felix Gerard Torquil Ifor Andrew, Seattle, WA (US); Ahmad Khalifa Eesa Ahmad, Sammamish, WA (US); Michael C. Fanning, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 124 days.

(21) Appl. No.: 13/725,081

(22) Filed: Dec. 21, 2012

(65) Prior Publication Data

US 2014/0181592 A1  Jun. 26, 2014

(51) Int. Cl.
*G06F 11/00* (2006.01)
*G06F 11/36* (2006.01)

(52) U.S. Cl.
CPC ............ *G06F 11/3664* (2013.01); *G06F 11/36* (2013.01); *G06F 11/3636* (2013.01)

(58) Field of Classification Search
CPC ........................................................ G06F 11/36
USPC ................... 714/38.1, 37; 717/124, 125, 126
See application file for complete search history.

(56) References Cited

U.S. PATENT DOCUMENTS

| | | | |
|---|---|---|---|
| 5,815,714 A * | 9/1998 | Shridhar et al. | 717/129 |
| 5,815,720 A * | 9/1998 | Buzbee | 717/158 |
| 6,131,185 A | 10/2000 | Coskun et al. | |
| 6,874,140 B1 | 3/2005 | Shupak | |
| 7,657,873 B2 | 2/2010 | Horton et al. | |
| 7,779,395 B1 * | 8/2010 | Chotin et al. | 717/137 |
| 7,950,004 B2 * | 5/2011 | Vieira et al. | 717/125 |
| 8,621,435 B2 * | 12/2013 | Aharoni et al. | 717/125 |
| 8,918,772 B1 * | 12/2014 | MacLachlan et al. | 717/154 |
| 2007/0226681 A1 | 9/2007 | Thorup | |
| 2007/0250819 A1 * | 10/2007 | Fjeldstad et al. | 717/129 |
| 2010/0037211 A1 * | 2/2010 | Zakonov et al. | 717/130 |
| 2010/0058297 A1 * | 3/2010 | Sutanto et al. | 717/128 |
| 2011/0107306 A1 | 5/2011 | Shah et al. | |
| 2013/0104107 A1 * | 4/2013 | De Smet et al. | 717/125 |

OTHER PUBLICATIONS

"Using the Visual Debugger in NetBeans IDE", Retrieved at <<http://netbeans.org/kb/docs/java/debug-visual.html>> Retrieved Date: Nov. 1, 2012, pp. 6.
"Debugging Silverlight XAML", Retrieved at <<http://msdn.microsoft.com/en-us/library/gg181270(v=vs.95).aspx>> Retrieved Date: Nov. 1, 2012, pp. 2.

* cited by examiner

*Primary Examiner* — Dieu-Minh Le
(74) *Attorney, Agent, or Firm* — Kevin Sullivan; Aaron Hoff; Micky Minhas

(57) ABSTRACT

A method for diagnosing declarative source elements in an application, such as in debugging markup source elements or visual elements in an application, is disclosed. Diagnosis information is associated with an object source of a visual element. The diagnosis information is provided for the visual element during the runtime of the application.

20 Claims, 3 Drawing Sheets

DIAGNOSTICS OF DECLARATIVE SOURCE ELEMENTS

BACKGROUND

Program debugging, or debugging, is a methodical process of finding and reducing the number of bugs, or defects, in a computer program or a piece of electronic hardware to make the computer program behave as expected. Debugging in general is a lengthy, tiresome task, and programmers often use a software tool such as a debugger operating on a debuggee process to monitor execution of the computer program and to perform program debugging. During investigation of the program, the programmer may stop the execution of the debuggee process, collect data values, or otherwise affect the execution of the debuggee process based on the values of the variables. Debugging is often performed prior to deployment of a program as part of quality assurance, but end users also can discover bugs during use of the program. If a program crashes during use of the program by an end user, an operating system can collect information regarding the crash and provide the information over a network connection to the developer as a crash dump.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Software development technologies have advanced to provide many developers with additional tools to readily create programs with rich user experiences adapted for multiple platforms and systems with customization for selected user groups in ways once only available to the most advanced developers. Many of these development technologies have made traditional debugging processes more difficult for a number of reasons. In the debugging of declarative source elements, the use of declarative markup languages—which serve to provide benefits in creating visual elements or user interface (UI) elements, for example—makes difficult finding the location of the product sources that represent the elements. In some cases, developers sort through many resource files or string tables to find code or mark-up relevant to resolving a single bug. Traditional methods of debugging, such as consulting a stack, are less than helpful because either the relevant break points are no longer available on the stack or are out of context on the stack, such that it is difficult to find the code of the visual element particularly when asynchronous code or event models are used to create the application.

A method for diagnosing declarative source elements in an application—such as in debugging markup source elements, visual elements in an application, and the like—is disclosed. Diagnosis information is associated with the declarative object source. In one example, the diagnosis information is annotated into the object source during compilation, or compile time, of the application. A compiler can build an intermediate file that is compiled into an executable that includes the diagnosis information and the object markup source. In one example, the diagnosis information can include data such as a file name, line number or column details of code associated with the visual element (or other data that can be used to identify source document location), and other information that may assist in determining where the elements are declared. The diagnosis information is provided for the element during the runtime of the application. If the runtime raises an exception or encounters a breakpoint, for example, the diagnosis information can be used to locate and correct the bug quickly and efficiently over previous methods of debugging elements such as visual objects. In other examples, the diagnosis information can be selectively obtained from the runtime, such as broadcast from the runtime to various software tools to assist in quality control.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various exemplary embodiments described herein may be combined with each other, unless specifically noted otherwise.

Figure 1:
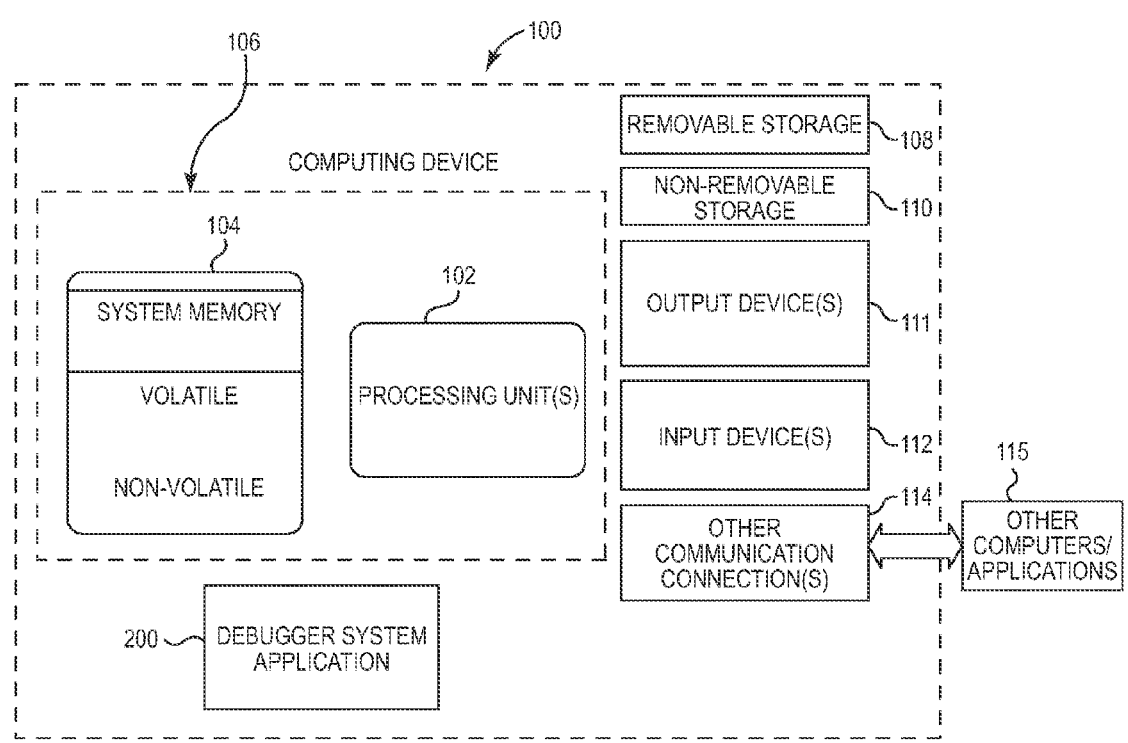
FIG. 1 is a block diagram illustrating an example of a computing device.

FIG. 1 illustrates an exemplary computer system that can be employed in an operating environment and used to host or run a computer application included on one or more computer readable storage mediums storing computer executable instructions for controlling the computer system, such as a computing device, to perform a process to associate diagnostic information along with an object markup source of an element in an application. The computer system can also be used to develop and/or run computer applications having processes to evaluate the diagnosis information retrieved from runtime of the application.

The exemplary computer system includes a computing device, such as computing device 100. In a basic hardware configuration, computing device 100 typically includes a processor system having one or more processing units, i.e., processors 102, and memory 104. By way of example, the processing units may include, but are not limited to, two or more processing cores on a chip or two or more processor chips. In some examples, the computing device can also have one or more additional processing or specialized processors (not shown), such as a graphics processor for general-purpose computing on graphics processor units, to perform processing functions offloaded from the processor 102. The memory 104 may be arranged in a hierarchy and may include one or more levels of cache. Depending on the configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device 100 can take one or more of several forms. Such forms include a tablet, a personal computer, a workstation, a server, a handheld device, a consumer electronic device (such as a video game console), or other, and can be a stand-alone device or configured as part of a computer network, computer cluster, cloud services infrastructure, or other.

Computing device 100 can also have additional features or functionality. For example, computing device 100 may also include additional storage. Such storage may be removable and/or non-removable and can include, but is not limited to, magnetic or optical disks or solid-state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by computing device 100. Any such computer storage media may be part of computing device 100.

Computing device 100 often includes one or more input and/or output connections, such as USB connections, display ports, proprietary connections, and others to connect to various devices to provide inputs and outputs to the computing device. Input devices 112 may include devices such as keyboard, pointing device (e.g., mouse), pen, voice input device, touch input device, or other. Output devices 111 may include devices such as a display, speakers, printer, or the like.

Computing device 100 often includes one or more communication connections 114 that allow computing device 100 to communicate with other computers/applications 115. Example communication connections can include, but are not limited to, an Ethernet interface, a wireless interface, a bus interface, a storage area network interface, a proprietary interface. The communication connections can be used to couple the computing device 100 to a computer network, which can be classified according to a wide variety of characteristics such as topology, connection method, and scale. A network is a collection of computing devices and possibly other devices interconnected by communications channels that facilitate communications and allows sharing of resources and information among interconnected devices. Examples of computer networks include a local area network, a wide area network, the Internet, or other network.

Computing device 100 can be configured to run an operating system software program and one or more computer applications, which make up a system platform. A computer application configured to execute on the computing device 100 includes at least one process (or task), which is an executing program. Each process provides the resources to execute the program. One or more threads run in the context of the process. A thread is the basic unit to which an operating system allocates time in the processor 102. The thread is the entity within a process that can be scheduled for execution. Threads of a process can share its virtual address space and system resources. Each thread can include exception handlers, a scheduling priority, thread local storage, a thread identifier, and a thread context, or thread state, until the thread is scheduled. A thread context includes the thread's set of machine registers, the kernel stack, a thread environmental block, and a user stack in the address space of the process corresponding with the thread. Threads can communicate with each other during processing through techniques such as message passing.

An operation may execute in a thread separate from the main application thread. When an application calls methods to perform an operation, the application can continue executing on its thread while the method performs its task. Concurrent programming for shared-memory multiprocessors can include the ability for multiple threads to access the same data. The shared-memory model is the most commonly deployed method of multithread communication. Multiple threads execute on multiple processors, multiple processor cores, multiple logical nodes in a single processor core, and/or other classes of parallelism that are attached to a memory shared between the processors.

Some embodiments of the computing device 100 include a call stack. A call stack is a stack data structure constructed in memory 104 that stores information about the active subroutines of a running computer program. This kind of stack is also known as an execution stack, control stack, run-time stack, machine stack, or just "the stack". A call stack is used for several related purposes, and one is to keep track of the point to which each active subroutine returns control when it finishes executing. An active subroutine is one that has been called but is yet to complete execution after which control is handed back to the point of call. Such activations of subroutines may be nested to any level, hence the stack structure. The caller pushes the return address onto the stack. The called subroutine, when it finishes, pops the return address off the call stack and transfers control to that address. If a called subroutine calls on to another subroutine, another return address is pushed onto the call stack, and so on, with the information stacking up and un-stacking as the program dictates. One call stack is often associated with a running program or with each task or thread of a process, although additional stacks may be created for signal handling or cooperative multitasking. The call stack can provide diagnostic information such as the origin of runtime artifacts in which runtime issues tend to be manifested at later times.

In one example, the computing device 100 includes a software component referred to as a managed environment. The managed environment can be included as part of the operating system or can be included later as a software download. Typically, the managed environment includes pre-coded solutions to common programming problems to aid software developers to create applications, such as software programs, to run in the managed environment. Examples of managed environments can include an application framework or platform available under the trade designation .NET Framework from Microsoft Corporation of Redmond, Wash. U.S.A, and Java now from Oracle Corporation of Redwood City, Calif., U.S.A., as well as others and can include web application frameworks often designed to support the development of dynamic websites, web applications and web services.

The managed environment is configured to accept programs written in a high-level compatible code of one or more programming languages to be used on different computer platforms without having to be rewritten for specific architectures. For example, the managed environment can accept programs written in compatible programming languages such as C# (C-sharp) code, a visual basic type language such as VB.NET code, and several other languages, for example a Java type language (such as J#, or J-sharp). Typically, each program written in a compatible language will be compiled into a second platform-neutral language with corresponding compilers within a Common Language Infrastructure (CLI). In the case of the .NET framework, the second platform-neutral language is often referred to as the Common Intermediate Language (CIL). The program in the second platform-neutral language is provided to a runtime compiler, such as the Microsoft Common Language Runtime (CLR) in the .NET framework, that compiles the program in the second platform-neutral language into a platform-specific machine-readable code that is executed on the current platform or computing device.

Declarative source elements can be created in a number of formats among which can include a markup format. One particular example of creating an object markup source is with a declarative Extensible Markup Language (XML) or a declarative XML based language. Extensible Application Markup Language (XAML) is one example of a declarative XML based language used for initializing structured values and objects. XAML is used in the .NET framework technologies to form a user interface markup language to define UI elements, data binding, eventing, and other features. XAML elements map directly to CLR object instances, while XAML attributes map to CLR properties and events on those objects. An aspect of the technology is the reduced complexity needed for tools to process XAML, because it is based on XML.

Figure 2:
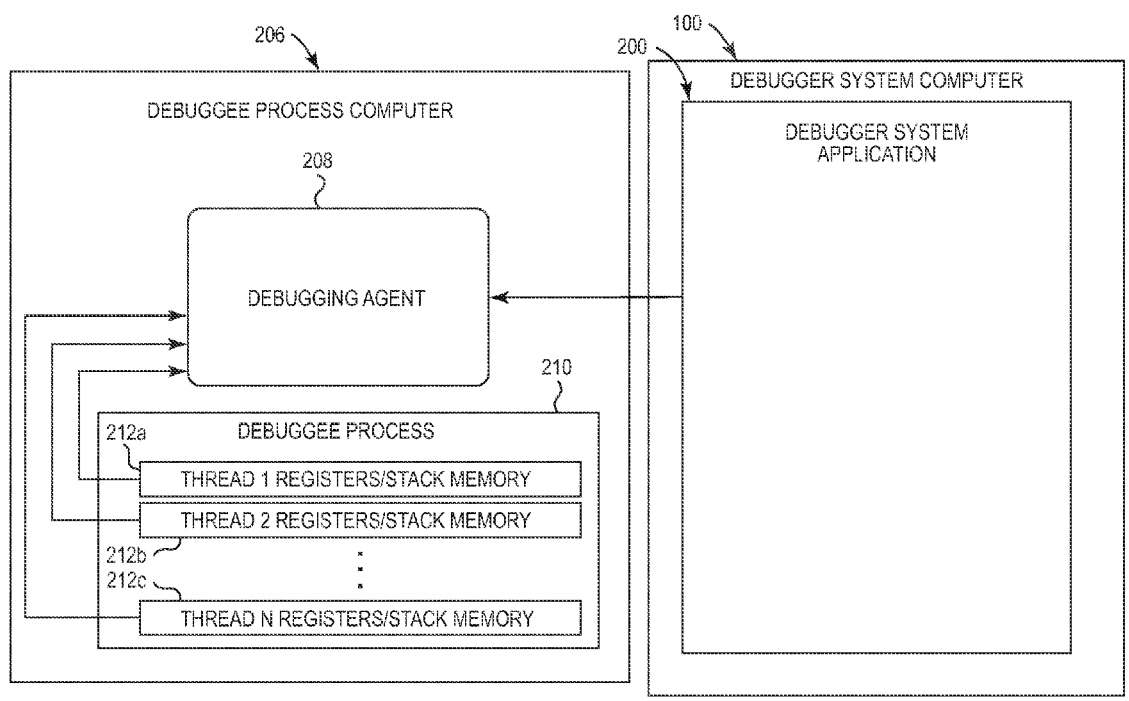
FIG. 2 is a block diagram illustrating an example of a diagnostic tool configured to run on one or more computing devices of FIG. 1.

FIG. 2 illustrates an example diagnostic tool configured to run on the computing device 100. In one implementation, computing device 100 includes a debugger system application 200. One embodiment of a debugger system computer 100 (e.g., computing device 100 illustrated in FIG. 1) comprising a debugger system application 200 interfacing with a debuggee process computer 206 (e.g., a computing device similar to computing device 100 illustrated in FIG. 1) comprising a debugging agent 208 and a debuggee process 210 is illustrated in FIG. 2.

Debugger system application 200, debugging agent 208, and debuggee process 210 can be implemented on any suitable type and suitable number of computer systems, such as computing device 100 illustrated in FIG. 1. In one embodiment, debugger system application 200 is one of the application programs that reside on computing device 100, debugging agent 208 is one of the application programs that reside on debuggee process computer 206, and debuggee process 210 is one of the application programs that reside on debuggee process computer 206. Debugger system application 200, however, can alternatively or additionally be embodied as computer executable instructions on one or more computers and/or in different variations than illustrated in FIG. 1. Alternatively or additionally, one or more parts of debugger system application 200 can be stored in system memory 104, on other computers/applications 115, or other such suitable variations for running a debugger system application.

In one embodiment, debugging agent 208 is on a debuggee process computer 206 that is remote from debugger system computer 100 that includes debugger system application 200. In other embodiments, however, debugging agent 208 and/or debuggee process 210 resides on the same computer as debugger system application 200. The debugger system application is configured to request a current call stack of multiple threads of debuggee process 210. In the embodiment illustrated in FIG. 2, debuggee process 210 includes threads 1, 2, . . . N which correspondingly have thread registers and stack memory indicated at 212a, 212b, . . . 212c.

Embodiments of debugger system application 200, debugging agent 208, and debuggee process 210 are described in the general context of computer-executable instructions, such as program modules, being executed by a computer. Generally, program modules include routines, programs, objects, components, data structures, etc. that perform particular tasks or implement particular abstract data types. Embodiments may be practiced in distributing computing environments where tasks are performed by remote processing devices that are linked through a communications network. In a distributed computer environment, program modules may be located in both local and remote computer storage media including media storage devices.

In one example, the debugger system application 200 can be a part of an integrated development environment, or IDE. The IDE can include a code editor, a compiler, build tools, a debugger and other tools for developing and testing an application. An example of an IDE is available under the trade designation "Visual Studio" from Microsoft or under the trade designation "Xcode" from Apple, Inc., of Cupertino, Calif. U.S.A. The debugger system application 200 can also be a separate product that can be used with one or more IDE packages or as a stand-alone product.

An historical mechanism for debugging application code is to associate source file locations with compiled object code. The generated metadata regarding this association is typically stored in a separate file such as a program database or PDB although some compilers have provided a facility for bundling this information into the binary. A program database (PDB) file holds debugging and project state information that allows incremental linking of a debug configuration to the application. The executable code/PDB mechanism provides an effective mechanism for diagnostics scenarios such as debugging, because the relationship between the original source and the final object code executed at runtime is fixed at compilation and remains unchanged across a broad range of runtime contexts such as when running on operating systems that are localized to multiple languages.

This model incurs difficulties in more declarative programming frameworks and/or when there is some latency introduced into the code generation process that might allow for variance in the production of code at runtime. The XAML development model, for example, provides an XML-driven declarative model for authoring visual controls and UI elements. This XML typically does not literally represent execution semantics for constructing runtime objects. Instead, it provides a declarative roadmap that describes the hierarchy of objects, their member and property values, and other information, that is instantiated and set at runtime to realize some UI element. This approach decouples information related to the appearance of UI elements from information related to the behavior of the UI element, which decreases costs related to customizing or altering code so that a single application can be localized to multiple languages for users throughout the world. An application contains documents dedicated to presentation that helps isolate information such as the user-facing strings, control size, and location details that govern the appearance of a UI component in a given locale, and these documents are distinct from code that governs application behavior. After authoring the application behavior for a single locale (such as the United States), the data related strictly to appearance (such as the user-facing strings) can be generated for additional languages, such as German, without requiring changes to the literal code of the program.

Another example includes the generation of other locale-specific information such as string tables. In these cases, the implementation loads a user-facing string by reference to a key/identifier. The key/identifier is passed to a resource manager that performs a look-up based on the current locale of the runtime environment. The look-up can provoke the system to probe for the appropriate resources container, sometimes based on fairly elaborate logic. In a rudimentary example, a request for a Canadian-English (EN-CA) version of a string might fall back to the U.S.-English version (EN-US) if no EN-CA version is available.

The basic mechanism above presents specific debugging challenges. In one example, a bug expressed in the UI may occur in a localized version of the application. In these cases, the primary developers of the program might not understand or be able to read the language of the localized application that is failing. The challenge becomes how to identify the underlying code that has an issue in order to route it to the appropriate engineer to fix.

There is another diagnostic challenge that has to do with changes of programming models related to the trend towards separating presentation/behavior. For these coding models, it is very common to implement an event-driven model. The portion of the code that is dedicated to UI behavior will associate handlers to UI controls with reference to an identifier that is rendered in the declarative portion of the UI. The result is that during program operation, a dispatch mechanism provides notifications that pass the 'sender' (i.e., the control that generated the event) as an argument to handlers. The control itself is not a direct caller of the handler, which effectively removes some critical information from the stack. The event handler knows that a button has generated a click event, but the event handler cannot identify the button or the dialog or other UI control for the button. This problem is compounded in cases where a single handler is repurposed to serve many different instances of a control or controls, which is both a common and recommended practice.

Another recent programming trend is to minimize the code used to associate data with visual elements and to maintain that data over time such as by responding to appropriate user events. This is accomplished in part by providing for sophisticated data-binding features, in which some collection of data is associated with a UI element. At runtime, the system locates and associates the specific data collection with a control. In one example, a list-box is associated with a collection of user names that are themselves referenced in the mark-up by the property/member name of the collection that includes the names. The relevant collections are instrumented to receive and to generate notifications regarding mutations to the data, which can result in the proper updating of UI and maintenance of the collection depending on the directional flow of events. The challenge here involves the significant work completed at runtime in order to put a visual element that binds to some data into a coherent state. If, at runtime, the data source cannot be located or it contains data that cannot be rationalized with a control, for example, an exception might be raised or the control might be in some undesired/incorrect state.

The disclosure provides examples that address these challenges by associating relevant information related to the source documents for UI-relevant information with compiler-generated code/artifacts. For example, XAML file/line information is associated with UI controls declared in that format. With this information, a developer can refer to the definitive source locations from which these runtime-instantiated objects originate. In the debugger, a developer can inspect the object that a handler receives as the notification 'sender' and query the system to find the file/line location it was declared in. At runtime, the developer can put the application in a special mode where these file/line locations actually render in the UI. This can be used to address localization issues because a developer, despite not being able to read the localized language, is still able to find the file name that can be used to determine who own the core code of the displayed UI. In another example, the application can generate events or notifications at runtime that are handled by an external software tool to publish or display the diagnosis information. An external tool might also be able to 'connect' to a running application and actively query it for the diagnosis information.

Also, the association can work in both directions. Currently, designers have a facility for instantiating an empty object that can be styled, or hydrated sufficiently to design the appearance, text contents, and other items of the UI element without running the application. With the examples of the disclosure, the designer experience can be augmented by associating a running object that originates with a specific presentation file with the designer view of that class. Standard mechanisms can be invoked to put the class into design mode and then further augment the designer instance with actual values from a specific running object instance. This ability to design against a live object provides some additional possibilities that are difficult to achieve with a more restricted instantiation model implied by design mode.

Figure 3:
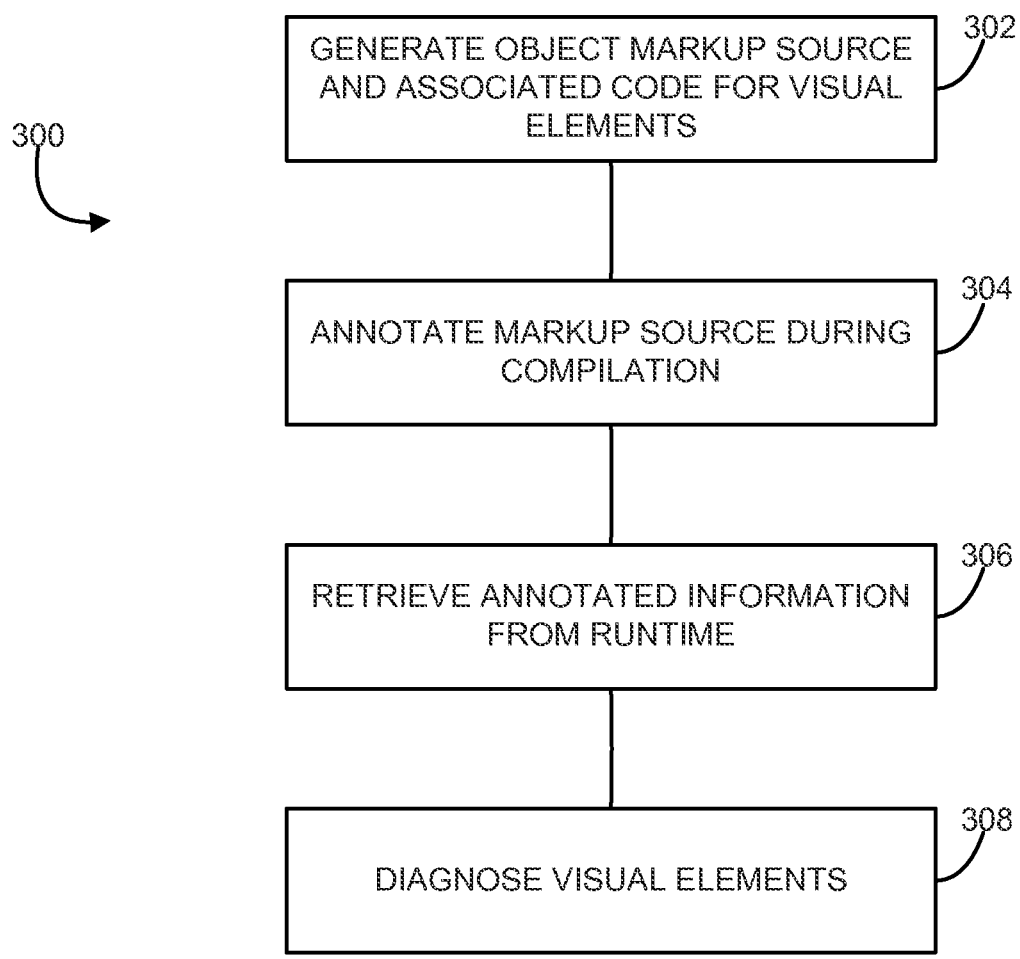
FIG. 3 is a block diagram of a method for diagnosing visual elements that can be configured to run on a computing device of FIG. 1.

FIG. 3 illustrates a method 300 for addressing the challenges presented in diagnosing declarative source elements, such as visual elements in the examples illustrated below. Method 300 can be implemented as a tool to be run on the computing device 100. In one example, the tool is a software program or part of a software package such as an IDE. The software program can be included in a computer readable storage medium storing computer executable instructions for controlling a computing device, such as computing device 100, to perform the method 300.

In one example, a developer generates visual elements with an object markup source. In certain examples, visual elements can include a child or children. A visual element child can include encapsulated non-visual data as well as contained visual elements. During a development phase, an object markup source, such as a XAML file, and the code associated with the markup source are created at 302 as part of the development of the application.

During compilation of the application, or build time, the object markup source is annotated with information to find lines of code associated with the visual elements and build the objects at 304. A compiler, such as a XAML compiler for XAML files, can be used to annotate the markup source. In one example, the annotations can be added to each UI element in an intermediate file. The intermediate file can be in the same data format as the markup source such as an intermediate XAML file. In another example, the intermediate file could be in a compatible data format to the object markup source such as a C# file, when the object markup source is not in C#, that would contain emitted code that executes at runtime and can apply the elements with annotations. The annotations can include information such as filename, line number and/or column information of the code associated with the visual elements, hierarchical information (such as the owner or parent) associated with a visual element, and other information. Additional information could be included to log bugs or for testing after the application is deployed such as build number and other information.

The compiler will parse code, resolve various type and semantic information, and emit executable code. The diagnosis information can be associated with the markup source before the code generation piece, such as by producing additional compilable intermediate files or by modifying the compiled source directly to include the diagnosis information. The diagnosis information can be included in a dynamic-link library (DLL), an executable, or in a directly executed binary image.

During runtime, the annotation information is available and can be obtained from the object to determine where the object was declared in the markup at 306. The runtime executes compiled code, with the result that visual elements are constructed, annotated with specified properties, and populated/bound-to corresponding data sources. The data sources could include data collections, e.g., a set of names pulled from the web, storage medium, database or other, or locale-specific sources, e.g., a localized string could be retrieved based on current locale of the application. The runtime processes the intermediate files, instantiates the objects, and sets properties. In one example, the loader/runtime, such as an XAML loader, is property agnostic and sets the properties of the objects. The attached properties can remain set for the lifetime of the object.

The annotation information can be retrieved from runtime and used to diagnose the visual elements at 308. When the runtime raises an exception, such as a data binding exception for example, the annotation information can be retrieved to provide meaningful diagnostic information, such as the source code location of the control that did not bind. In one example, a developer can apply the annotation information prior to deployment of the application. When the application encounters a break point, or other selected point during the runtime, the visual objects are presented for inspection and the annotation information is retrieved. This information can be used to locate and correct the bug quickly and efficiently over previous methods of debugging visual objects. In one example, the information is provided as part of screen capture, such as with bitmap and other data, as part of a crash dump sent to the developer. In the case where a large or diverse team has developed the application, the information retrieved from a crash can be used to triage the bug and route the particular problem code to the developer responsible for its maintenance.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of diagnosing declarative source elements in an application, comprising:
   associating diagnosis information during compilation of the application with an object source of an element to determine a corresponding variable execution code from a delayed code generation for the element; and
   providing the diagnosis information for the element during runtime of the application.

2. The method of claim 1 wherein associating the diagnosis information during compilation of the application includes annotating diagnostic information.

3. The method of claim 1 wherein the object source is a declarative extensible markup file.

4. The method of claim 3 wherein the declarative extensible markup file is a extensible application markup language (XAML) file.

5. The method of claim 1 wherein the diagnosis information includes at least one of file name, source document location associated with the element, and build number.

6. The method of claim 2 wherein the annotating diagnosis information is performed with a compiler.

7. The method of claim 6 wherein the compiler is a compiler for the object source.

8. The method of claim 6 wherein the compiler builds an intermediate file including from the object source.

9. The method of claim 8 wherein the diagnosis information is included in the intermediate file.

10. The method of claim 8 wherein the compiler packages the intermediate file as part of an executable.

11. The method of claim 1 wherein the diagnosis information is provided when the runtime raises an exception.

12. The method of claim 11 wherein the exception is a data binding exception and the diagnosis information is used to determine a control that did not bind.

13. A system for diagnosing visual elements in an application, the system comprising:
    a processor and memory configured to:
    annotate diagnostic information during compilation of the application into an object markup source of a visual element to determine a corresponding variable execution code from a delayed code generation for the element; and
    provide the diagnostic information for the visual element during runtime of the application.

14. The system of claim 13 wherein the diagnostic information is provided when an exception is encountered.

15. The system of claim 13 wherein the processor and memory are configured to:
    generate an intermediate file from the object markup source file including the diagnostic information during compilation of visual element; and
    determine from the diagnostic information of the visual element where the visual element was declared in the runtime.

16. The system of claim 13 wherein the diagnostic information is available from a screen capture.

17. The system of claim 16 wherein the screen capture is included in a crash dump.

18. The system of claim 13 wherein a compiler builds an object including the diagnostic information from the intermediate file.

19. The system of claim 13 wherein the diagnostic information is selectively provided from the runtime.

20. A computer readable storage medium, which does not include a transitory propagating signal, storing computer-executable instructions that, when executed by a computer system, perform a method of diagnosing visual elements in an application comprising:
    receiving a declarative extensible markup source file and associated code for a visual element in the application;
    annotating diagnosis information including source document location of the declarative extensible markup source file associated with the visual element into the declarative extensible markup file of the visual element during compilation of the application to determine the associated variable execution code from a delayed code generation for the element;
    loading the declarative extensible markup file of the visual element during a runtime; and providing the diagnosis information at selected points during the runtime of the application.

* * * * *